United States Patent
Zhang (10) Patent No.: US 12,311,931 B2
(45) Date of Patent: May 27, 2025

(54) VEHICLE SPEED PLANNING BASED ON TIMING OF CONSECUTIVE TRAFFIC LIGHTS

(71) Applicant: GM GLOBAL TECHNOLOGY OPERATIONS LLC, Detroit, MI (US)

(72) Inventor: Yuan Zhang, Shanghai (CN)

(73) Assignee: GM GLOBAL TECNOLOGY OPERATIONS LLC, Detroit, MI (US)

( * ) Notice: Subject to any disclaimer, the term of this patent is extended or adjusted under 35 U.S.C. 154(b) by 623 days.

(21) Appl. No.: 17/457,229

(22) Filed: Dec. 1, 2021

(65) Prior Publication Data

US 2023/0136682 A1     May 4, 2023

(51) Int. Cl.
*B60W 30/14* (2006.01)
*B60W 40/04* (2006.01)
*B60W 50/14* (2020.01)

(52) U.S. Cl.
CPC .......... *B60W 30/143* (2013.01); *B60W 40/04* (2013.01); *B60W 50/14* (2013.01); *B60W 2050/146* (2013.01); *B60W 2555/60* (2020.02)

(58) Field of Classification Search
CPC .... B60W 30/143; B60W 40/04; B60W 50/14; B60W 2050/146; B60W 2555/60; B60W 2520/10; B60W 2520/105; B60W 2556/45; B60W 2720/10; B60W 50/0097
See application file for complete search history.

(56) References Cited

U.S. PATENT DOCUMENTS

| | | | |
|---|---|---|---|
| 8,478,500 B1 * | 7/2013 | Vahidi | G08G 1/096716 701/93 |
| 2001/0034575 A1 * | 10/2001 | Takenaga | B60W 30/16 180/170 |
| 2008/0012726 A1 * | 1/2008 | Publicover | G08G 1/096725 340/932 |
| 2011/0098898 A1 * | 4/2011 | Stahlin | B60W 30/18154 701/1 |
| 2012/0130611 A1 * | 5/2012 | Al Alam | B60W 30/188 180/170 |
| 2014/0046509 A1 * | 2/2014 | Otake | G08G 1/096775 701/2 |
| 2016/0318490 A1 * | 11/2016 | Ben Shalom | B60K 31/0008 |

(Continued)

FOREIGN PATENT DOCUMENTS

EP     2945140 A1 * 11/2015 .......... B60W 30/143

*Primary Examiner* — Jelani A Smith
*Assistant Examiner* — Alyssa Rorie
(74) *Attorney, Agent, or Firm* — Lorenz & Kopf LLP (57) ABSTRACT

Methods and systems are provided for vehicle speed planning based on timing of traffic lights. In an exemplary embodiment, a disclosed system includes one or more sensors of a vehicle; a transceiver; and a processor. The one or more sensors are configured to obtain vehicle sensor data pertaining to operation of the vehicle. The transceiver is configured to obtain traffic light data with respect to a plurality of traffic lights along a path or roadway on which the vehicle is travelling. The processor is coupled to the one or more sensors and to the transceiver, and is configured to at least facilitate: determining a desired control of movement of the vehicle based on the vehicle sensor data, the traffic light data, and one or more optimization criteria pertaining to the vehicle; and taking a vehicle action based on the desired control of movement of the vehicle.

20 Claims, 3 Drawing Sheets

(56) References Cited

U.S. PATENT DOCUMENTS

| | | | |
|---|---|---|---|
| 2017/0243481 A1* | 8/2017 | Neubecker | G08G 1/096716 |
| 2018/0059669 A1* | 3/2018 | Madigan | H04W 4/029 |
| 2020/0193821 A1* | 6/2020 | Kawaharada | B60W 30/18 |
| 2020/0312127 A1* | 10/2020 | Doemling | G01C 21/3407 |
| 2021/0009128 A1* | 1/2021 | Jokela | B60W 50/0097 |
| 2022/0041169 A1* | 2/2022 | Krishna | G07C 5/0816 |
| 2022/0126810 A1* | 4/2022 | Tokura | B60W 30/18127 |
| 2022/0219689 A1* | 7/2022 | Chang | G06V 10/56 |
| 2022/0348193 A1* | 11/2022 | Hu | B60W 10/18 |

* cited by examiner

FIG. 3

VEHICLE SPEED PLANNING BASED ON TIMING OF CONSECUTIVE TRAFFIC LIGHTS

CROSS REFERENCE TO RELATED APPLICATIONS

This application claims the benefit of Chinese Application No. 202111253403.3, filed Oct. 29, 2021 which is herein incorporated by reference in its entirety.

INTRODUCTION

The technical field generally relates to vehicles and, more specifically, to methods and systems for controlling vehicle using vehicle planning based on timing of traffic lights.

Certain vehicles today include systems for controlling certain aspects of vehicle movement, such as adaptive cruise control. However, such existing vehicle systems may not always provide optimal vehicle control planning, for example with respect to different segments along a roadway in which the vehicle is travelling.

Accordingly, it is desirable to provide improved methods and systems for controlling vehicles, including using vehicle planning based on traffic lights along the roadway in which the vehicle is travelling. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: (i) obtaining, via one or more sensors of a vehicle, vehicle sensor data pertaining to operation of the vehicle: (ii) obtaining, via a transceiver, traffic light data with respect to a plurality of traffic lights along a path or roadway on which the vehicle is travelling: (iii) determining, via a processor, a desired control of movement of the vehicle based on the vehicle sensor data, the traffic light data, and one or more optimization criteria pertaining to the vehicle; and (iv) taking a vehicle action in accordance with instructions provided by the processor based on the desired control of movement of the vehicle.

Also in an exemplary embodiment, the step of determining the desired control of movement includes determining, via the processor, a desired speed for the vehicle, based on the vehicle sensor data, the traffic light data, and the one or more optimization criteria pertaining to the vehicle.

Also in an exemplary embodiment, the step of taking the vehicle action includes automatically controlling a speed of the vehicle to meet the desired speed, via the instructions provided by the processor and implementation of the instructions via one or more vehicle systems coupled to the processor.

Also in an exemplary embodiment, the automatic controlling of the speed of the vehicle is implemented as part of an adaptive cruise control system of the vehicle.

Also in an exemplary embodiment, the step of taking the vehicle action includes providing a notification for a driver of the vehicle as to the desired speed, via the instructions provided by the processor and implemented by a display system of the vehicle that is coupled to the processor.

Also in an exemplary embodiment, the step of obtaining the vehicle sensor data includes obtaining a measured speed and a measured acceleration of the vehicle from the one or more sensors of the vehicle; the step of obtaining the traffic light data includes obtaining color change frequency data with respect to each of the plurality of traffic lights via the transceiver; and the step of determining the desired speed includes determining, via the processor, the desired speed of the vehicle based on the measured speed, the measured acceleration, the color change frequency data, and the one or more optimization criteria pertaining to the vehicle.

Also in an exemplary embodiment, the one or more optimization criteria includes preventing the vehicle from having to make a complete stop at the plurality of traffic lights.

Also in an exemplary embodiment, the one or more optimization criteria further includes minimizing fuel consumption for the vehicle.

Also in an exemplary embodiment, the one or more optimization criteria further includes minimizing adjustments to control of the vehicle.

Also in an exemplary embodiment, the step of determining the desired speed includes determining, via the processor, the desired speed of the vehicle based on the measured speed, the measured acceleration, the color change frequency data, and the one or more optimization criteria pertaining to the vehicle using processor-based algorithms via both: coarse-grain speed planning for the vehicle based on the vehicle sensor data in combination with the traffic light data from the first traffic light or multiple consecutive traffic lights of the plurality of traffic lights; and fine-grain speed planning for the vehicle based on the vehicle sensor data in combination with the traffic light data from the first traffic light or multiple consecutive traffic lights of the plurality of traffic lights.

Also in an exemplary embodiment, the coarse-grain speed planning, the fine-grain speed planning, or both, are also based on an estimated queue with respect to one or more of the plurality of traffic lights.

In another exemplary embodiment, a system is provided that includes: one or more sensors of a vehicle that are configured to obtain vehicle sensor data pertaining to operation of the vehicle: a transceiver configured to obtain traffic light data with respect to a plurality of traffic lights along a path or roadway on which the vehicle is travelling; and a processor that is coupled to the one or more sensors and to the transceiver and is configured to at least facilitate: determining a desired control of movement of the vehicle based on the vehicle sensor data, the traffic light data, and one or more optimization criteria pertaining to the vehicle; and taking a vehicle action based on the desired control of movement of the vehicle.

Also in an exemplary embodiment, the processor is further configured to at least facilitate: determining a desired speed for the vehicle, based on the vehicle sensor data, the traffic light data, and the one or more optimization criteria pertaining to the vehicle; and taking the vehicle action based on the desired control of movement of the vehicle.

Also in an exemplary embodiment, the processor is further configured to at least facilitate automatically controlling a speed of the vehicle to meet the desired speed.

Also in an exemplary embodiment, the system further includes a display system of the vehicle: wherein the processor is further configured to provide instructions to the display system for providing a notification for a driver of the vehicle as to the desired speed, and the display system is configured to implement the instructions to provide the notification for the driver as to the desired speed.

Also in an exemplary embodiment, the one or more sensors are configured to obtain a measured speed and a measured acceleration of the vehicle: the traffic light data includes obtaining color change frequency data with respect to each of the plurality of traffic lights; and the processor is configured to at least facilitate determining the desired speed of the vehicle based on the measured speed, the measured acceleration, the color change frequency data, and the one or more optimization criteria pertaining to the vehicle.

Also in an exemplary embodiment, the one or more optimization criteria includes preventing the vehicle from having to make a complete stop at the plurality of traffic lights.

Also in an exemplary embodiment, the processor is configured to at least facilitate determining the desired speed of the vehicle based on the measured speed, the measured acceleration, the color change frequency data, and the one or more optimization criteria pertaining to the vehicle using processor-based algorithms via both: coarse-grain speed planning for the vehicle based on the vehicle sensor data in combination with the traffic light data from the first traffic light or multiple consecutive traffic lights of the plurality of traffic lights; and fine-grain speed planning for the vehicle based on the vehicle sensor data in combination with the traffic light data from the first traffic light or multiple consecutive traffic lights of the plurality of traffic lights.

Also in an exemplary embodiment, the processor is configured to implement the coarse-grain speed planning, the fine-grain speed planning, or both, are also based on an estimated queue with respect to one or more of the plurality of traffic lights.

In a further exemplary embodiment, a vehicle is provided that includes: a body: a drive system configured to generate movement of the body: one or more sensors disposed onboard the vehicle and configured to at least facilitate obtaining vehicle sensor data pertaining to operation of the vehicle: a transceiver disposed onboard the vehicle and configured to obtain traffic light data with respect to a plurality of traffic lights along a path or roadway on which the vehicle is travelling; and a processor that is disposed onboard the vehicle and coupled to the one or more sensors, the transceiver, and the drive system, the processor configured to at least facilitate: determining a desired control of movement of the vehicle, including the body thereof, based on the vehicle sensor data, the traffic light data, and one or more optimization criteria pertaining to the vehicle; and taking a vehicle action based on the desired control of movement of the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
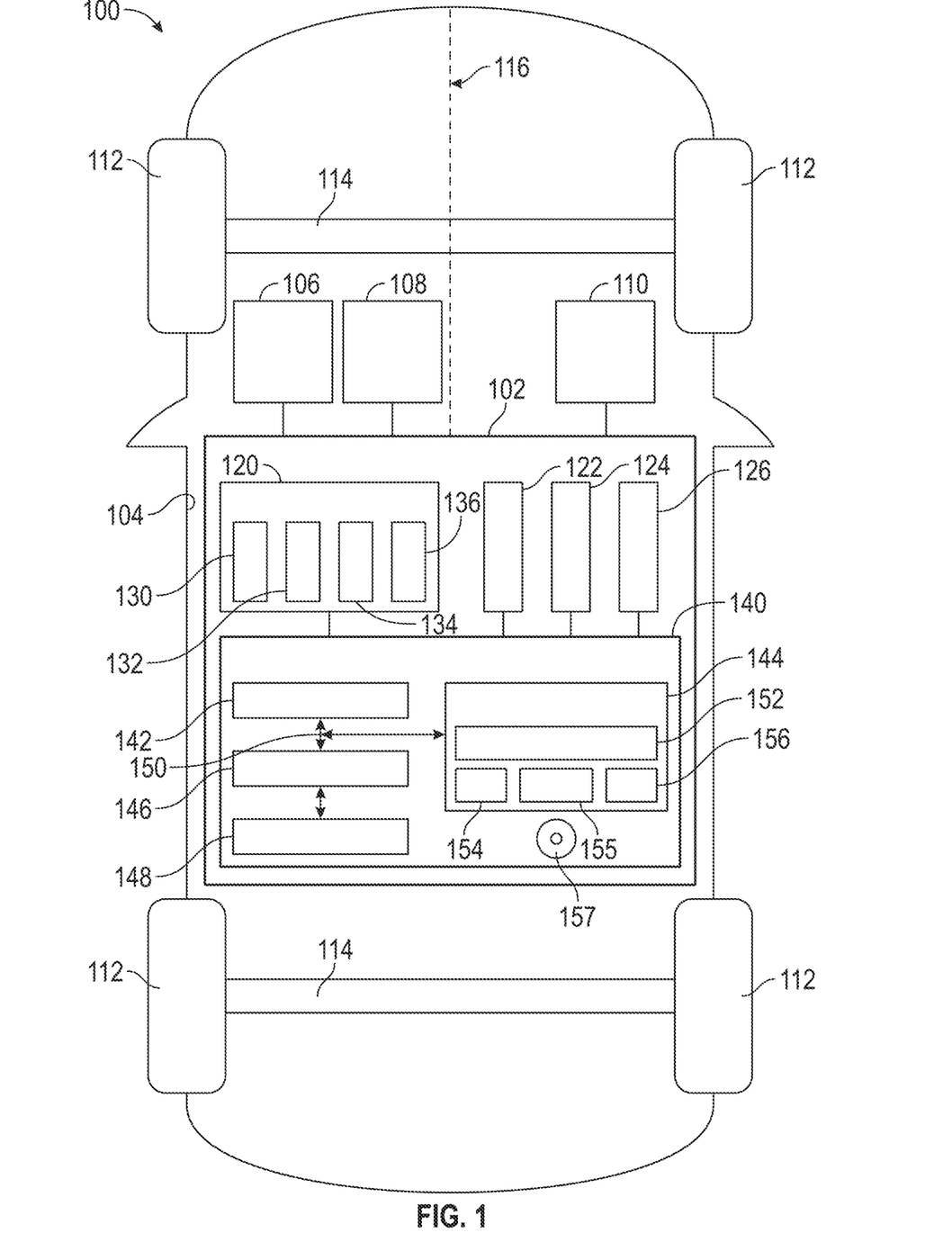
FIG. 1 is a functional block diagram of a vehicle that includes a control system for controlling movement of the vehicle, including with respect to timing of consecutive traffic lights, in accordance with exemplary embodiments.

FIG. 1 illustrates a vehicle 100, according to an exemplary embodiment. As described in greater detail further below, the vehicle 100 includes a control system 102 that is configured for controlling movement of the vehicle 100, including with respect to timing of consecutive traffic lights, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, the control system 102 is coupled to the braking system 106, and the drive system 110. In certain embodiments, the control system 102 may also be coupled to the steering system 108. Also as depicted in FIG. 1, in various embodiments, the control system 102 includes a sensor array 120, one or more transceivers 122 and display systems 124, a location system 126, and a controller 140.

In various embodiments, the sensor array 120 includes various sensors that obtain sensor data for use in controlling movement of the vehicle 100, including with respect to timing of travel through consecutive traffic lights on a roadway or path (collectively herein referred to as a "roadway") on which the vehicle 100 is travelling. In the depicted embodiment, the sensor array 120 includes speed sensors 130, acceleration sensors 132, and input sensors 134. In certain embodiments, the sensor array 120 may also include one or more other sensors 136 (e.g., in certain embodiments, one or more steering sensors, braking sensors, and so on).

In various embodiments, the speed sensors 130 include one or more wheel speed sensors and/or other sensors configured to measure a speed and/or velocity of the vehicle 100 and/or data used to calculate the speed and/or velocity of the vehicle 100.

Also in various embodiments, the acceleration sensors 132 include one or more accelerometers and/or other sensors configured to measure an acceleration of the vehicle 100 (e.g., accelerator over a period of time and/or instantaneous acceleration) and/or data used to calculate the acceleration of the vehicle 100.

Also in various embodiments, the input sensors 134 include one or more sensors that are configured to receive inputs from a driver and/or one or more other operators and/or users of the vehicle 100. For example, in certain embodiments, the input sensors 134 may include one or more touch screens, dials, buttons, audio sensors (e.g., microphones) and/or other sensors configured to receive inputs from the driver and/or other users as to the driver and/or user's intent (e.g., as to an intended destination, an intended travel route, an intended engagement of adaptive cruise control and/or other vehicle features, an intended steering direction and magnitude for the vehicle 100, an intended braking magnitude for the vehicle 100, and so on).

Also in certain embodiments, the other sensors 136 may include one or more steering angle sensors for the vehicle (e.g., via the steering system 108, such as via one or more of the wheels 112, axles 114, and/or steering column of the steering system 108 for the vehicle 100, and so on).

In various embodiments, the one or more transceivers 122 receive and transmit messages between the vehicle 100 and one or more other vehicles, remote servers, traffic lights, other infrastructure, and/or other entities outside the vehicle 100. In certain embodiments, the transceivers 122 receive wireless messages from one or more other vehicles, remote servers, traffic lights, other infrastructure, and/or other entities outside the vehicle 100 with respect to operation of upcoming traffic lights along a roadway in which the vehicle 100 is travelling (including, for example, specific time periods in which the traffic lights are expected to be of different colors, such as red and green, in various embodiments).

In various embodiments, the one or more display systems 124 provide communications between the control system 102 and one or more drivers and/or other users of the vehicle 100. For example, in certain embodiments, the one or more display systems 124 provide instructions and/or recommendations for the driver or other user of the vehicle 100 for adjusting and/or maintain speed of the vehicle 100 in order to optimally time upcoming traffic lights, based on instructions provided by and determinations made by the control system 102. In various embodiments, a display system 124 may include various components, such as, among other possible components: (i) an audio component to provide audio instructions and/or recommendations: (ii) a visual component to provide visual instructions and/or recommendations; and/or (iii) a haptic component to provide haptic instructions and/or recommendations, and/or to provide haptic enhancement to audio and/or visual instructions and/or recommendations.

Also in various embodiments, the location system 126 is configured to obtain and/or generate data as to a position and/or location in which the vehicle is located and/or is travelling. In certain embodiments, the location system 126 comprises and/or or is coupled to a satellite-based network and/or system, such as a global positioning system (GPS) and/or other satellite-based system.

In various embodiments, the controller 140 is coupled to the sensor array 120, transceiver 122, display system 124, and location system 126, and provides instructions to and controls operation thereof. In various embodiments, the controller 140 may also be coupled to, provide instructions to, and control operation of the braking system 106, the steering system 108, the drive system 110, and/or one or more other vehicle systems and/or components. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls vehicle operation, including movement of the vehicle 100 in view of upcoming traffic lights (and including limiting full stops of the vehicle 100, limiting re-adjustment of vehicle movement instructions, and optimizing fuel consumption of the vehicle 100) based on processing performed by the controller 140 utilizing the sensor data and other data and/or information obtained via the control system 102. In various embodiments, the controller 140 provides these and other functions in accordance with the steps of the process of FIG. 2 and the strategies with an exemplification of FIG. 3.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 discussed further below in connection with FIG. 2 and the strategies with an exemplification of FIG. 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154 (e.g., from and/or used in connection with the location system 126), one or more tables 155 (e.g., look-up tables for controlling vehicle actions, including vehicle speed), and one or more stored values 156 (e.g., including, in various embodiments, one or more threshold values for controlling vehicle actions, including vehicle speed).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, transceiver 122, and/or the location system 126, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 discussed further below in connection with FIG. 2 and the strategies with an exemplification of FIG. 3. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
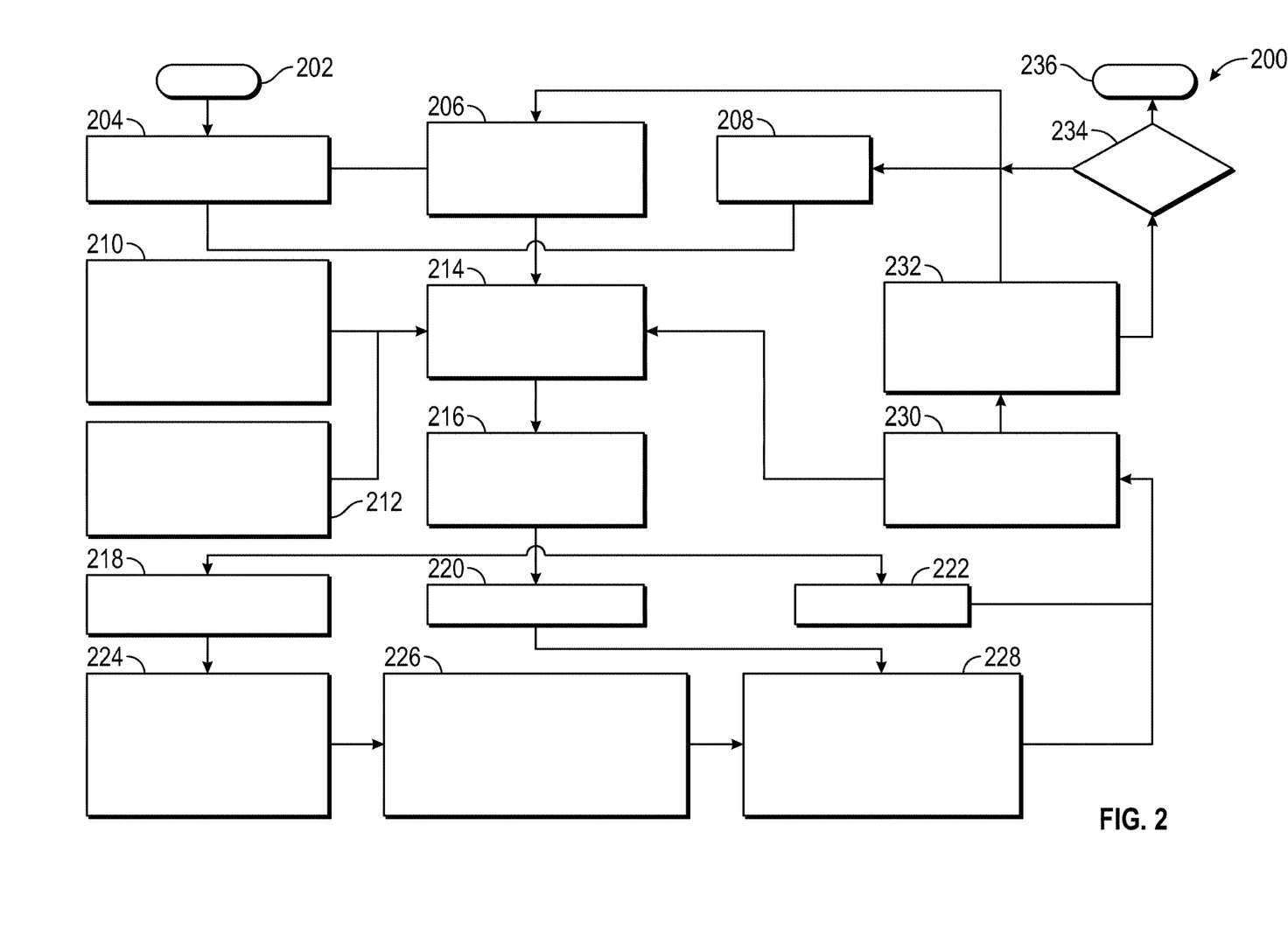
FIG. 2 is a flowchart of a process for controlling movement of a vehicle with respect to timing of consecutive traffic lights, and that can be implemented in connection with the vehicle and control system of FIG. 1, in accordance with exemplary embodiments.

FIG. 2 is a flowchart of a process 200 for controlling movement of a vehicle with respect to timing of consecutive traffic lights, in accordance with exemplary embodiments. In various embodiments, the process 200 can be implemented in connection with the vehicle 100 and control system 102 of FIG. 1, and components thereof. The process 200 will also be discussed further below with additional reference to FIG. 3, which provides a graphical illustration 300 of an exemplary planning strategy used in the process 200 of FIG. 2, including the timing of the vehicle through consecutive traffic lights, in accordance with exemplary embodiments.

As depicted in FIG. 2, in various embodiments, the process 200 begins at step 202. In one embodiment, the process 200 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 200 are performed continuously during operation of the vehicle.

Traffic light information is obtained (step 202). In certain embodiments, the traffic light information includes phase information pertaining to multiple traffic lights that are on a roadway or path on which the vehicle 100 is travelling. For example, in certain embodiments, the traffic light information includes, for each traffic light: (i) upcoming time periods in which the traffic light will be green; and (ii) upcoming time periods in which the traffic light will not be green (e.g., yellow and/or red).

Figure 3:
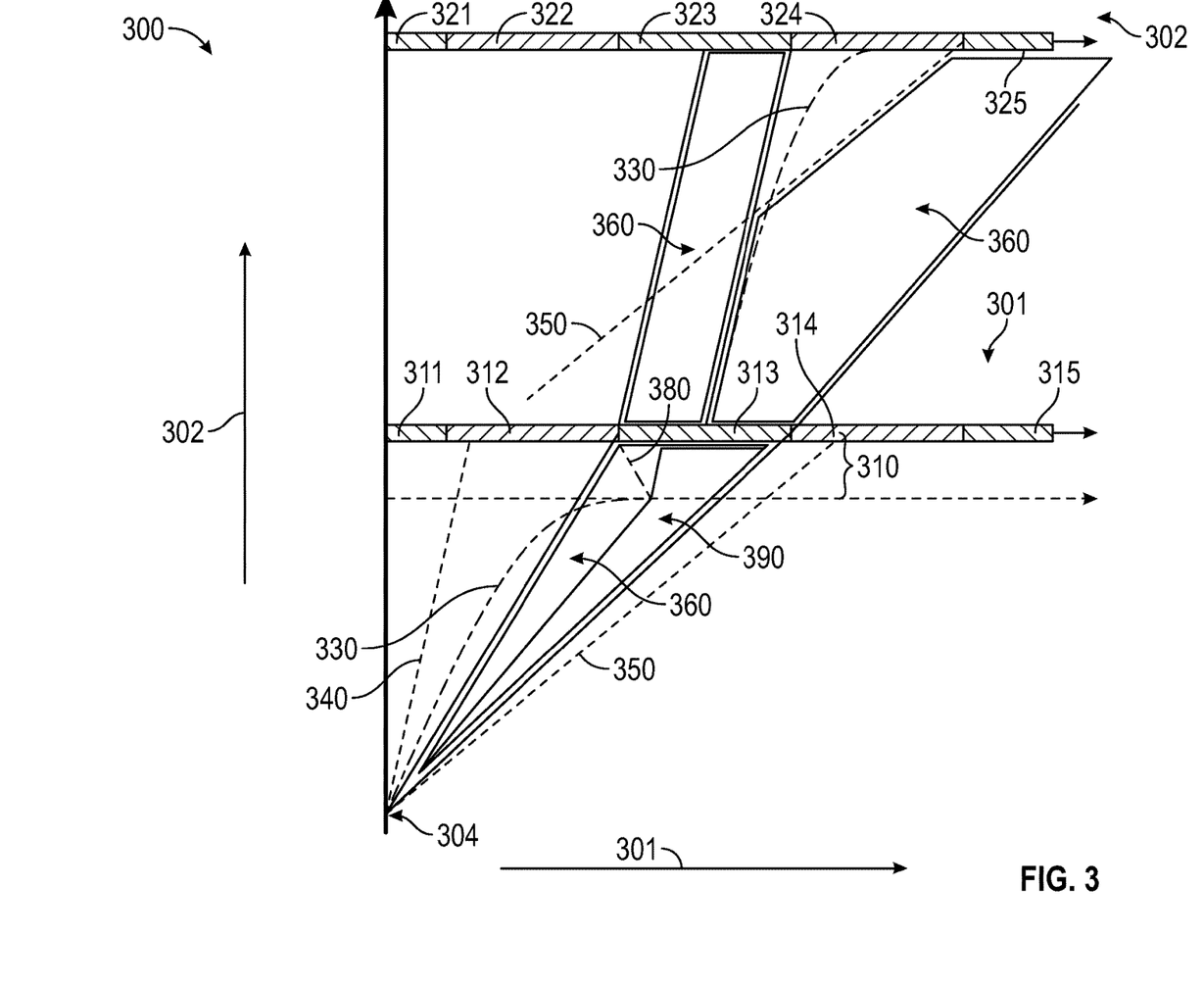
FIG. 3 is a graphical illustration of an exemplary implementation of the process of FIG. 2, including the timing of the vehicle through consecutive traffic lights, in accordance with exemplary embodiments.

For example, with reference to FIG. 3, the graphical illustration 300 includes two consecutive traffic lights, namely: (i) a first traffic light 301; and (ii) a second traffic light 302, both along a roadway in which the vehicle 100 is travelling. By way of additional background, the graphical illustration 300 includes an x-axis 301 representing time, and a y-axis 302 representing distance along the roadway direction. As depicted in FIG. 3, the first traffic light 301 is expected to be green during time periods 311, 313, and 315 (i.e., in which travel through the first traffic light 301 is permitted), and is expected to be red (or yellow) during time periods 312 and 314 (i.e., in which travel through the first traffic light 301 is prohibited or discouraged). Also as depicted in FIG. 3, the second traffic light 302 is expected to be green during time periods 321, 323, and 325 (i.e., in which travel through the second traffic light 302 is permitted), and is expected to be red (or yellow) during time periods 322 and 324 (i.e., in which travel through the second traffic light 302 is prohibited or discouraged).

With reference back to FIG. 2, during step 204, this traffic light information (including the frequencies as to the colors and associated change of colors of the traffic lights) is included as part of the traffic light information of step 204, with respect to both the first and second traffic lights 301, 302. Also in various embodiments, similar traffic light information is also obtained during step 204 regarding other traffic lights in sequence along the traffic roadway or path on which the vehicle 100 is travelling (and, in certain embodiments, on roadways in which the vehicle 100 will soon be travelling, for example based on a selected destination and/or route of travel that may have previously been inputted by the user, and so on).

In various embodiments, the traffic light information is obtained via one or more transceivers 122 of the vehicle 100 of FIG. 1 via one or more wireless communications networks. In certain embodiments, the transceiver 122 receives the traffic light information from one or more vehicles along the same roadway, for example, via vehicle-to-vehicle communications. In certain other embodiments, the transceiver 122 receives the traffic light information from a remote server. In certain other embodiments, the transceiver 122 receives the traffic light information from one or more traffic lights themselves, and/or from one or more other infrastructure, devices, and/or systems along the roadway, for example via vehicle to infrastructure communications.

Also in various embodiments, vehicle sensor data is obtained (step 206). In various embodiments, vehicle sensor data is obtained from the sensor array 120 of FIG. 1 as to parameters of operation of the vehicle 100. In certain embodiments, a current values of vehicle speed and vehicle acceleration are obtained for the vehicle 100. In certain embodiments, such speed and acceleration values are obtained via one or more speed sensors 130 and accelerometers 132 of FIG. 1. In certain other embodiments, such speed and acceleration values may instead be obtained via one or more input sensor 134 of FIG. 1, for example as representing one or more speed and/or acceleration values and/or limits as set by the driver or other user of the vehicle 100, for example as settings for adaptive cruise control (ACC) functionality for the vehicle 100.

In addition, in certain embodiments, a location of the vehicle is determined (step 208). In certain embodiments, one or more temporal-spatial locations of the vehicle 100 of FIG. 1 are determined and/or identified via the location system 126 of FIG. 1 (e.g., a GPS system).

Also in various embodiments, traffic information is obtained (step 210). In various embodiments, real-time traffic information is obtained via the transceiver 122 of FIG. 1 with respect to the roadway or path on which the vehicle 100 is travelling. In certain embodiments, such real-time traffic information may include, by way of example, information as to a number of other vehicle along the roadway and speeds thereof, as well as whether a queue has developed along the roadway, whether other vehicles have cut ahead into the queue, an estimated duration of the queue (including an end-of-queue status), and so on. In various embodiments, the traffic information is obtained via the transceiver 122 via one or more wireless networks from one or more sources remote from the vehicle 100, including from other vehicles (vehicle to vehicle communications), a remote server, and/or from traffic lights and/or other infrastructure along the roadway (vehicle to infrastructure communications), and so on.

Also in various embodiments, other vehicle information is obtained (step 212). In various embodiments, the information of step 212 may include, among other possible information, data and information pertaining to lane changes and driver intention. For example, in certain embodiments, this may include information as to whether the vehicle 100 is presently changing lanes or about to change lanes. Such data may be obtained, for example, from one or more input sensors 134 of FIG. 1 (e.g., as to a driver's activation of a turn signal indicator) and/or other sensors 136 of FIG. 1 (e.g., as to an angle or change thereof of one or more wheels 112 of the vehicle 100, and/or of a steering column, brake pedal, accelerator pedal, of the vehicle 100, and so on).

In various embodiments, a condition judgment is performed with data pre-processing (step 214). In certain embodiments, during step 214, preliminary determinations are made as to an optimal velocity for the vehicle 100 in meeting one or more predefined objectives, using the data of steps 204-212. For example, in certain embodiments, the processor 142 of FIG. 1 makes one or more preliminary determinations as to an optimal speed for the vehicle 100 based on travelling through consecutive traffic lights (e.g., first and second traffic lights 301, 302 of FIG. 3) while the traffic lights are on "green" so that the vehicle 100 does not need to make a full stop. In certain embodiments, the preliminary determinations may also be based at least in part on one or more other predetermined criteria, such as minimizing fuel consumption, minimizing required changes to vehicle control (e.g., minimizing changes to vehicle velocity), and so on. In certain embodiments, during step 214, pre-processing is performed on the data of each of steps 204-212 to facilitate subsequent processing for speed planning by the processor 142. Also in certain embodiments, the processing of step 214 may include some or all of the calculations described further below in connection with steps 224-228 (described further below), but for example in a simplified manner (in certain embodiments). Also in various embodiments, the processor 142 uses a machine-learning-based judgement approach in step 214 (as well as in steps 224-228 described further below). In certain embodiments, one or more processor-based algorithms are utilized in step 214 (as well as for steps 224-228 described further below) in implementing the machine learning (and/or, in certain embodiments, one or more other processor-based algorithm techniques such as pseudo spectrum, look-up table based numerical optimization, and so on). In certain embodiments, step 214 may provide some approximated results for the step 230, and subsequently some pre-defined difference with the previously derived planning results can be calculated.

Also in various embodiments, a branch selection is made (step 216). In various embodiments, the branch selection is made by the processor 142 of FIG. 1 based on the determinations of step 214. Specifically, in various embodiments, during step 214, the processor 142 determines which of the following branches for the process 200 to take: namely: (i) a "multi-segment re-derivation" branch (described further below in connection with step 218): (ii) a "minor adjustment" branch (described further below in connection with step): or (iii) a "no update" branch (described further below in connection with step 228). In certain embodiments, during step 216: (i) if there is no previously derived planning results pertaining to the current road segment, the "multi-segment re-derivation" branch is selected; and (ii) otherwise, the process calculates the difference between the approximated results given by step 214 and the previously derived planning results with a pre-defined difference metric, and then compares this difference with some pre-defined thresholds, and the branch selection is determined based on the comparisons.

When the "multi-segment re-derivation" branch is selected in step 216, then the process proceeds to step 218.

During step 218, the selection of the "multi-segment re-derivation" branch is implemented, and the data obtained up until this point is made available accordingly for implementation of this branch by the processor 142. In this embodiment. during step 224, the data is utilized by the processor 142 for coarse-grain speed planning with respect to a first traffic light. In various embodiments, the processor 142 utilizes coarse-grain vehicle speed planning for the vehicle 100 in order to assess favorability of possible passing times for travelling through a nearest traffic light along the roadway in which the vehicle 100 is travelling (and, in various embodiments, in the same direction of travel of the vehicle 100). For example, in various embodiments, the processor 142 utilizes the data of steps 204-214 along with processor-based algorithms including machine learning techniques (and/or, in certain embodiments, one or more other processor-based algorithm techniques such as pseudo spectrum, look-up table based numerical optimization, and so on) for providing a coarse-grain analysis for optimal speeds for the vehicle 100 in order for the vehicle 100 to successfully travel through the first traffic light 301 of FIG. 1 without having to make a full stop. In certain embodiments, one or more processor-based algorithms are utilized in implementing the machine learning (and/or, in certain embodiments, one or more other processor-based algorithm techniques such as pseudo spectrum, look-up table based numerical optimization, and so on). It is noted that in certain embodiments, the calculations of step 218 have different objectives as compared with the previous calculations of step 214 (described above). For example, in certain embodiments, the pre-processing of step 214 determines a rough extent of one or more regions (e.g., described further below in connection with FIG. 3) that are feasible for non-stop pass through at the forthcoming traffic light(s), based on their signal timing. (high and low) speed limits, and the modeling of intersection queuing: while the calculations in step 218 are intended in certain embodiments to perform further characterization on the possible passing time range at the forthcoming traffic light(s), e.g. evaluating the favorability of each sub-ranges of this range with one or more quantitative metrics.

Also during the "multi-segment re-derivation" branch, coarse-grain speed planning results are generated (step 226). In various embodiments, the coarse-gran speed planning results are generated via the determinations of step 224, and in various embodiments represent the outputs of step 224. In various embodiments, the coarse-grain speed planning results include a list or range of temporal-spatial locations of vehicle arrival with respect to the first traffic light, along with favorability values (and/or in certain embodiments confidence values) associated with different vehicle speeds for the vehicle 100 and their expected effects on the vehicle 100 being able to travel through the first traffic light without having to come to a complete stop. In various embodiments, these outputs are determined as a result of the processing of step 224 based at least in part on optimizing the travelling time by measuring the favorability of possible passing through the first traffic light with a "green" signal at a particular point in time, with some pre-defined optimization objective function under certain feasibility constraints with possible utilization of machine learning techniques. In certain embodiments, one or more processor-based algorithms are utilized in implementing the machine learning (and/or, in certain embodiments, one or more other processor-based algorithm techniques such as pseudo spectrum, look-up table based numerical optimization, and so on).

Also in various embodiments, during the "multi-segment re-derivation" branch, the process then proceeds to step 228.

As described in greater detail further below, during step 228, fine-grain speed planning is performed with respect to the first traffic light or multiple consecutive traffic lights along the roadway in which the vehicle 100 is travelling (e.g., with respect to both the first and second traffic lights 301, 302 of FIG. 3, and/or additional consecutive traffic lights along the roadway in which the vehicle 100 is travelling, in various embodiments).

In certain embodiments, depending for example on factors including one or more real-time situations presented for the vehicle 100 and/or the roadway, steps 224, 226, and/or 228 may be performed based on the first traffic light only, or based on multiple consecutive traffic lights, and so on/

With reference back to step 216, when it is instead determined during step 216 that the "minor adjustment" branch is selected, then the process proceeds to step 220. During step 220, the selection of the "minor adjustment" branch is implemented, and the data obtained up until this point is made available accordingly for implementation of this branch by the processor 142. Specifically, in this embodiment, when in the "minor adjustment" branch, the process skips (i.e., bypasses) steps 224 and 226, and instead proceeds directly to step 228, in which fine-grain speed planning is performed with respect to the first traffic light or multiple consecutive traffic lights along the roadway in which the vehicle 100 is travelling (as described in greater detail further below).

Also with reference back to step 216, when it is instead determined during step 216 that the "no update" branch is selected, then the process proceeds to step 222. During step 222, the selection of the "no update" branch is implemented, and the data obtained up until this point is made available accordingly for implementation of this branch by the processor 142. Specifically, in this embodiment, when in the "no update" branch, the process likewise skips (i.e., bypasses) steps 224 and 228, and instead proceeds directly to step 230, for which the previously derived planning results are directly presented to the enforcement module, with appropriate reference of time indication (as described in greater detail further below).

As noted above, during step 228, fine-grain speed planning is performed with respect to the first traffic light or multiple consecutive traffic lights along the roadway in which the vehicle 100 is travelling (e.g., with respect to both the first and second traffic lights 301, 302 of FIG. 3, and/or additional consecutive traffic lights along the roadway in which the vehicle 100 is travelling, in various embodiments). In various embodiments, during step 228, the processor 142 performs its determinations and processing utilizing the results from steps 214 and 216, and in certain situations also using the results from steps 224 and 226. Specifically, when the process 200 is in any of these three branches (i.e., the "multi-segment re-derivation" branch, the "minor adjustment" branch, or the "no update" branch) the results from steps 214 and 216 are utilized. In addition, when the process 200 is in the "multi-segment re-derivation" branch, the results from steps 224 and 226 are also utilized, in addition to the results from steps 214 and 216.

In various embodiments, during step 228, the processor 142 uses these various results (for example, as described in 226, above) as inputs for providing fine-grain speed planning for an optimal speed trajectory for the vehicle 100 in close-ahead ranges of the roadway, with one or more pre-defined optimization objective functions under one or more feasibility and smoothness constraints. In various embodiments, this processing is performed to optimize the probability of travelling through two or more consecutive traffic lights along the roadway without the vehicle 100 having to stop, and/or to optimize one or more criteria (e.g., minimizing fuel consumption and/or minimizing required updates or changes to the vehicle control planning, and so on).

In certain embodiments, the processor 142 utilizes an optimization objective function that incorporates the modeling of the rolling friction, aerodynamic drag and other relevant factors (e.g. some minor correction capturing the non-ideality of the modeling of dominating effects) into the fuel consumption for the vehicle 100, with the constraint conditions imposed on speed, acceleration and distance. In accordance with one such exemplary embodiment, the optimization may be given by the following equation:

$$\min_{v(t)} \int_{t_{start}}^{t_{end}} \left( c_{\mathit{effi}}(\text{sign}(a(t))) * \left( c_1 v^2(t) + Ma(t) + F_{comb}(\text{sign}(a(t))) \right) * v(t) + c_2 + f_{corr}(v(t), a(t)) \right) dt, \quad \text{(Equation 1)}$$

subject to the following constraints:

$$V_{min} \le v(t) \le v_{max}(V_{min} > 0), a_{min} \le a(t) \le a_{max}(a_{min} < 0) \quad \text{(Equation 2)},$$

and $$a(t_0) = \left( \frac{dv(t)}{dt} \right) \bigg|_{t=t_0}, \int_{t_{start}}^{t_{end}} v(t) dt = D, \quad \text{(Equation 3)}$$

in which: (i) v(t) and a(t) represent the speed and acceleration respectively, both represented in terms of (discretized) functions of time, (ii) M represents the mass of the vehicle: (iii) $c_1$ represents the constant related to aerodynamic drag: (iv) $c_2$ represents the constant related to auxiliary power: (v) $c_{\mathit{effi}}$(sign(a(t))) represents the efficiency coefficient: (vi) $F_{comb}$(sign(a(t))) represents the combined force of rolling friction, road inclination and vehicle braking: (vii) $C_{\mathit{effi}}$ and $F_{comb}$ depend only on the sign of a(t): (viii) $f_{corr}$(v(t), a(t)) represents the minor correction function: (ix) $t_{start}$ represents the current time: (x) $t_{end}$ represents the end time of fine-grain planning; and (xi) D represents the current distance to the end of fine-grain planning.

In various embodiments, the results of the processing and determinations of step 228 are provided in step 230. In various embodiments, results of step 230 include speed planning results with granularity determination, based on the processing of step 228 described above. In various embodiments, the speed planning results include speed adjustments for the vehicle In various embodiments, results of steps 228 and 230 (including the speed planning and speed adjustments for the vehicle 100) are implemented (step 232). In various embodiments, the processor 142 of FIG. 1 provides instructions to one or more vehicle systems and/or components, such as the braking system 106 and/or drive system 110, for implementing vehicle control commands for vehicle movement, including implementation of the speed planning and speed adjustments from steps 228 and 230. In various embodiments, these processor-based instructions for vehicle control actions, such as the speed planning and speed adjustments for the vehicle 100, are then implemented by the braking system 106, drive system 110, and/or other vehicle systems and/or components. For example, in certain embodiments, acceleration and/or braking of the vehicle 100 may be automatically adjusted in this manner, for example as part of an adaptive cruise control functionality for the vehicle 100.

Also in various embodiments, as part of step 232, one or more notifications are provided for a driver or user of the vehicle 100. In certain embodiments, the processor 142 provides instructions for the display system 124 of FIG. 1 to provide information to the driver or other user of the vehicle 100 as to recommendations and/or options for vehicle movement based on the results of steps 228 and 230, including recommended speed planning and speed adjustments from steps 228 and 230. In certain embodiments, the display system 124 implements the processor-based instructions by providing visual and/or audio notifications of recommended speed planning and speed adjustments for the vehicle 100, which may then be implemented by the driver of the vehicle 100. For example, in certain embodiments, the notifications may include one or more recommendations for speed increases or reductions (and/or an optimized target speed) for the vehicle 100 in order to meet the optimization criteria, such as passing through the consecutive traffic lights without stopping (and/or, in certain embodiments, for minimizing fuel consumption, minimizing vehicle command adjustments, and so on). In certain embodiments, the driver may be provided multiple options for achieving these objectives (e.g., by increasing speed in order to proceed through the consecutive traffic lights through one set of time windows, and/or decreasing speed in order to proceed through the traffic lights through another set of time windows, and so on).

In various embodiments, the recommendations and/or actions of steps 228-232 (e.g., both for recommendations for the driver and/or for automatic implementation by an adaptive cruise control system) may be filtered for various conditions and/or constraints such as speed limits, traffic congestion, and so on.

Also in various embodiments, the results of steps 228-230 are also implemented into step 214 in a new iteration, as shown in FIG. 2. For example, the results of steps 228-230 (including the vehicle control commands, including the speed planning and speed adjustments) may be utilized in various embodiments as part of the data pre-processing in one or more subsequent iterations of step 214.

Also in certain embodiments, a determination may be made (for example, following step 232, and/or at one or more various times during the process 200) as to whether the process 200 is complete (e.g., in certain embodiments, if the vehicle 100 is turned off, and/or if a functionality or system using the process 200 is turned off).

In various embodiments, if the process 200 is not yet complete, then the process 200 returns to step 208 in a new iteration. In various embodiments, a new and/or updated temporal-spatial location is provided for the vehicle 100 during a new iteration of step 208, and the process 200 continues.

Conversely, in various embodiments, if it is determined that the process 200 is complete, then the process 200 terminates at step 236.

With reference back to FIG. 3, certain features of the process 200 are illustrated in further detail. The graphical illustration 300 (referenced above) provides a high-level illustration of the speed planning approach intended for passing without full stop, through two or more consecutive intersections controlled by traffic lights (e.g., through the first and second traffic lights 301, 302 depicted in FIG. 3 and noted above).

It is noted that FIG. 3 depicts speed trajectories 330 that would require a full stop for the vehicle 100 at one or both of the first and second traffic lights 301, 302 of FIG. 3.

Also as provided in FIG. 3, the current spatial and temporal location 304 of the vehicle 100 is depicted, along with a maximum feasible speed 340 with high confidence. Also depicted in FIG. 3 is the scenario-specific minimum speed 350 with high confidence. Also depicted in FIG. 3 are prospective regions 360 of speed trajectory (in free flow) for the vehicle that can avoid a full stop for the vehicle 100.

In addition, in certain embodiments, the prospective ranges of avoiding a full stop may be further refined based on any potential queues encountered with respect to the traffic lights. For example, FIG. 3 depicts an expected que length 370 for the first traffic light 301, for when the first traffic light 301 is on red. In addition, a queue dissipation speed 380 is also depicted with respect to the queue for the first traffic light 301 for when the first traffic light 301 is on red (for example, the queue dissipation speed is reflected by the negative slope).

In addition, FIG. 3 also depicts que-impacted prospective ranges 390 of speed trajectory that can avoid a full stop for the vehicle 100 at the first traffic light 301, after consideration of the traffic light queue(s) and the dissipation thereof. In certain embodiments, with respect to possible uncertainties between the first and second traffic lights 301, 302, similar analysis of intersection queuing (not depicted in the figure) may similarly be performed, similar as for before the first traffic light 301, which may further delimitate the possible time range for the vehicle to pass through the first traffic light without full stop.

As illustrated in FIG. 3, in accordance with an exemplary embodiment, the process 200 of FIG. 2 provides one or more paths for travelling through consecutive traffic lights. Further, as illustrated in FIG. 3 and discussed above, such paths may include combinations of regions that are impacted not only by its associated traffic light status together with the queuing characteristics, but also impacted by those properties pertaining to the next road segment, for example as addressed in the multi-stage approach by the process 200 of FIG. 2.

In various embodiments, it is appreciated that the practical situation may be different from the depiction in FIG. 3, which represents the situation that there is some high enough probability for the vehicle to pass the first traffic light without full stop, and the second traffic light has noticeable impact on the vehicle's possible passing time at the first traffic light. For example, in certain embodiments, depending on the signal timings and uncertainties associated with the traffic lights, the practical situation may result in a very low probability for the vehicle 100 to pass the first traffic light 301 without a full stop, or the second traffic light 302 having negligible impact on the vehicle 100's possible passing time at the first traffic light 301. In certain embodiments, during these different situations, the framework depicted by FIG. 2 still applies, with the only difference that the underlying optimization criterion (objective function and the respective constraints) may be different.

Accordingly, methods, systems, and vehicles are provided for controlling vehicle movement in view of multiple traffic lights along a roadway or path in which the vehicle is travelling. In various embodiments, various traffic light data, vehicle data, and roadway data are utilized in order to plan and execute vehicle movement (including speed planning and speed adjustments for the vehicle) that help to prevent the vehicle 100 from making a complete stop (e.g., a complete stop at one of the traffic lights), and/or that help to optimize one or more other predetermined criteria (e.g., minimizing fuel consumption, minimizing adjustments to vehicle control, and so on).

It will be appreciated that the systems, vehicles, and methods may vary from those depicted in the Figures and described herein. For example, the vehicle 100 of FIG. 1, the control system 102 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2. It will similarly be appreciated that the implementations of FIG. 3 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining, via one or more sensors of a vehicle, vehicle sensor data pertaining to operation of the vehicle;
   obtaining, via a transceiver, traffic light data with respect to a plurality of traffic lights along a path or roadway on which the vehicle is travelling, the traffic light data including:
      with respect to a first traffic light along the path or roadway in which the vehicle is travelling, multiple first time intervals in which the first traffic light is expected to be green, along with multiple second time intervals in which the first traffic light is expected to be yellow or red, including multiple changes of the first traffic light between green and red; and
      with respect to a second traffic light along the path or roadway in which the vehicle is travelling, multiple third time intervals in which the second traffic light is expected to be green, along with multiple fourth time intervals in which the first traffic light is expected to be yellow or red, including multiple changes of the first second traffic light between green and red;
   determining, via a processor, a desired control of movement of the vehicle based on the vehicle sensor data, the traffic light data, and one or more optimization criteria pertaining to the vehicle, including a desired speed for the vehicle, such that the vehicle travels through the first traffic light during one of the multiple first time intervals in which the first traffic light is expected to be green, and such that the vehicle also travels through the second traffic light during one of the multiple third time intervals in which the second traffic light is expected to be green, while optimizing the one or more optimization criteria; and
   taking a vehicle action in accordance with instructions provided by the processor based on the desired control of movement of the vehicle, wherein the step of taking the vehicle action comprises automatically controlling a speed of the vehicle to meet the desired speed, via the instructions provided by the processor and implementation of the instructions via one or more vehicle systems coupled to the processor;

wherein the desired control of movement of the vehicle is determined by the processor based on the vehicle sensor data using:

coarse-grain speed planning, via machine learning applied by the processor to the sensor data with respect to both the first traffic light and multiple consecutive traffic lights of the plurality of traffic lights, and including in generating a list or range of temporal-spatial locations of vehicle arrival with respect to the first traffic light, along with favorability values and confidence values associated with different vehicle speeds for the vehicle and their expected effects on the vehicle being able to travel through the first traffic light without having to come to a complete stop, based at least in part on optimizing the travelling time by measuring the favorability of possible passing through the first traffic light with a green signal at a particular point in time, utilizing the machine learning in combination with the one or more optimization objective function under feasibility constraints; and fine-grain speed planning, via machine learning applied by the processor to the sensor data with respect to the first traffic light, the second traffic light, and additional consecutive traffic lights along the roadway in which the vehicle is travelling.

2. The method of claim 1, wherein the automatic controlling of the speed of the vehicle is implemented as part of an adaptive cruise control system of the vehicle.

3. The method of claim 1, wherein the step of taking the vehicle action further comprises:

providing a notification for a driver of the vehicle as to the desired speed, via the instructions provided by the processor and implemented by a display system of the vehicle that is coupled to the processor.

4. The method of claim 1, wherein:

the step of obtaining the vehicle sensor data comprises obtaining a measured speed and a measured acceleration of the vehicle from the one or more sensors of the vehicle;

the step of obtaining the traffic light data comprises obtaining color change frequency data with respect to each of the plurality of traffic lights via the transceiver; and the step of determining the desired speed comprises determining, via the processor, the desired speed of the vehicle based on the measured speed, the measured acceleration, the color change frequency data, and the one or more optimization criteria pertaining to the vehicle.

5. The method of claim 1, wherein the one or more optimization criteria further includes preventing the vehicle from having to make a complete stop at the plurality of traffic lights.

6. The method of claim 5, wherein the one or more optimization criteria further includes minimizing fuel consumption for the vehicle.

7. The method of claim 5, wherein the one or more optimization criteria further includes minimizing adjustments to control of the vehicle.

8. The method of claim 6, wherein the step of determining the desired speed comprises determining, via the processor, the desired speed of the vehicle based on the measured speed, the measured acceleration, the color change frequency data, and the one or more optimization criteria pertaining to the vehicle using processor-based algorithms via both:

the coarse-grain speed planning for the vehicle based on the vehicle sensor data in combination with the traffic light data from the first traffic light and the multiple consecutive traffic lights of the plurality of traffic lights; and the fine-grain speed planning for the vehicle based on the vehicle sensor data in combination with the traffic light data from the first traffic light and the multiple consecutive traffic lights of the plurality of traffic lights.

9. The method of claim 8, wherein both the coarse-grain speed planning and the fine-grain speed planning are based on estimated queues with respect to multiple of the plurality of traffic lights.

10. A system comprising:

one or more sensors of a vehicle that are configured to obtain vehicle sensor data pertaining to operation of the vehicle;

a transceiver configured to obtain traffic light data with respect to a plurality of traffic lights along a path or roadway on which the vehicle is travelling, the traffic light data including:

with respect to a first traffic light along the path or roadway in which the vehicle is travelling, multiple first time intervals in which the first traffic light is expected to be green, along with multiple second time intervals in which the first traffic light is expected to be yellow or red, including multiple changes of the first traffic light between green and red; and with respect to a second traffic light along the path or roadway in which the vehicle is travelling, multiple third time intervals in which the second traffic light is expected to be green, along with multiple fourth time intervals in which the first traffic light is expected to be yellow or red, including multiple changes of the first second traffic light between green and red; and a processor that is coupled to the one or more sensors and to the transceiver and is configured to at least facilitate:

determining a desired control of movement of the vehicle based on the vehicle sensor data, the traffic light data, and one or more optimization criteria pertaining to the vehicle, including a desired speed for the vehicle, such that the vehicle travels through the first traffic light during one of the multiple first time intervals in which the first traffic light is expected to be green, and such that the vehicle also travels through the second traffic light during one of the multiple third time intervals in which the second traffic light is expected to be green, while optimizing the one or more optimization criteria; and taking a vehicle action based on the desired control of movement of the vehicle, including by automatically controlling a speed of the vehicle to meet the desired speed;

wherein the processor is configured to determine the desired control of movement of the vehicle based on the vehicle sensor data using:

coarse-grain speed planning, via machine learning applied by the processor to the sensor data with respect to both the first traffic light and multiple consecutive traffic lights of the plurality of traffic lights, and including in generating a list or range of temporal-spatial locations of vehicle arrival with respect to the first traffic light, along with favorability values and confidence values associated with different vehicle speeds for the vehicle and their expected effects on the vehicle being able to travel through the first traffic light without having to come to a complete stop, based at least in part on optimizing the travelling time by measuring the favorability of possible passing through the first traffic light with a green signal at a particular point in time, utilizing the machine learning in combination with the one or more optimization objective function under feasibility constraints; and fine-grain speed planning, via machine learning applied by the processor to the sensor data with respect to the first traffic light, the second traffic light, and additional consecutive traffic lights along the roadway in which the vehicle is travelling.

11. The system of claim 10, further comprising:
a display system of the vehicle;
wherein the processor is further configured to provide instructions to the display system for providing a notification for a driver of the vehicle as to the desired speed, and the display system is configured to implement the instructions to provide the notification for the driver as to the desired speed.

12. The system of claim 10, wherein:
the one or more sensors are configured to obtain a measured speed and a measured acceleration of the vehicle;
the traffic light data comprises obtaining color change frequency data with respect to each of the plurality of traffic lights; and
the processor is configured to at least facilitate determining the desired speed of the vehicle based on the measured speed, the measured acceleration, the color change frequency data, and the one or more optimization criteria pertaining to the vehicle.

13. The system of claim 10, wherein the one or more optimization criteria includes preventing the vehicle from having to make a complete stop at the plurality of traffic lights.

14. The system of claim 12, the processor is configured to at least facilitate determining the desired speed of the vehicle based on the measured speed, the measured acceleration, the color change frequency data, and the one or more optimization criteria pertaining to the vehicle using processor-based algorithms via both:
the coarse-grain speed planning for the vehicle based on the vehicle sensor data in combination with the traffic light data from the first traffic light and the multiple consecutive traffic lights of the plurality of traffic lights; and
the fine-grain speed planning for the vehicle based on the vehicle sensor data in combination with the traffic light data from the first traffic light and the multiple consecutive traffic lights of the plurality of traffic lights.

15. The system of claim 14, wherein the processor is configured to implement both the coarse-grain speed planning and the fine-grain speed planning based on estimated queues with respect to multiple of the plurality of traffic lights.

16. A vehicle comprising:
a body;
a drive system configured to generate movement of the body;
one or more sensors disposed onboard the vehicle and configured to at least facilitate obtaining vehicle sensor data pertaining to operation of the vehicle, the traffic light data including:
with respect to a first traffic light along the path or roadway in which the vehicle is travelling, multiple first time intervals in which the first traffic light is expected to be green, along with multiple second time intervals in which the first traffic light is expected to be yellow or red, including multiple changes of the first traffic light between green and red; and
with respect to a second traffic light along the path or roadway in which the vehicle is travelling, multiple third time intervals in which the second traffic light is expected to be green, along with multiple fourth time intervals in which the first traffic light is expected to be yellow or red, including multiple changes of the first second traffic light between green and red;
a transceiver disposed onboard the vehicle and configured to obtain traffic light data with respect to a plurality of traffic lights along a path or roadway on which the vehicle is travelling; and
a processor that is disposed onboard the vehicle and coupled to the one or more sensors, the transceiver, and the drive system, the processor configured to at least facilitate:
determining a desired control of movement of the vehicle, including the body thereof, based on the vehicle sensor data, the traffic light data, and one or more optimization criteria pertaining to the vehicle, including a desired speed for the vehicle, such that the vehicle travels through the first traffic light during one of the multiple first time intervals in which the first traffic light is expected to be green, and such that the vehicle also travels through the second traffic light during one of the multiple third time intervals in which the second traffic light is expected to be green, while optimizing the one or more optimization criteria; and
taking a vehicle action based on the desired control of movement of the vehicle, including by automatically controlling a speed of the vehicle to meet the desired speed;
wherein the processor is configured to determine the desired control of movement of the vehicle based on the vehicle sensor data using:
coarse-grain speed planning, via machine learning applied by the processor to the sensor with respect to both the first traffic light and multiple consecutive traffic lights of the plurality of traffic lights, and including in generating a list or range of temporal-spatial locations of vehicle arrival with respect to the first traffic light, along with favorability values and confidence values associated with different vehicle speeds for the vehicle and their expected effects on the vehicle being able to travel through the first traffic light without having to come to a complete stop, based at least in part on optimizing the travelling time by measuring the favorability of possible passing through the first traffic light with a green signal at a particular point in time, utilizing the machine learning in combination with the one or more optimization objective function under feasibility constraints; and fine-grain speed planning, via machine learning applied by the processor to the sensor data with respect to the first traffic light, the second traffic light, and additional consecutive traffic lights along the roadway in which the vehicle is travelling.

17. The method of claim 1, wherein the optimization criteria incorporates modelling of rolling friction and aerodynamic drag into fuel consumption of the vehicle with constraint conditions imposed on speed, acceleration, and distance.

18. The method of claim 17, wherein the optimization is represented by the following equation:

$$\min_{v(t)} \int_{t_{start}}^{t_{end}} \left( c_{effi}(\text{sign}(a(t))) * \left( c_1 v^2(t) + Ma(t) + F_{comb}(\text{sign}(a(t))) \right) * v(t) + c_2 + f_{corr}(v(t), a(t)) \right) dt,$$

subject to the following constraints:

$$V_{min} \leq v(t) \leq V_{max}(V_{min} > 0), a_{min} \leq a(t) \leq a_{max}(a_{min} < 0),$$

and $$a(t_0) = \left( \frac{dv(t)}{dt} \right)\bigg|_{t=t_0}, \int_{t_{start}}^{t_{end}} v(t)dt = D,$$

in which: (i) v(t) and a(t) represent the speed and acceleration respectively, both represented in terms of (discretized) functions of time, (ii) M represents a mass of the vehicle; (iii) $c_1$ represents a constant related to aerodynamic drag; (iv) $C_2$ represents a constant related to auxiliary power; (v) $C_{effi}$ (sign(a(t))) represents an efficiency coefficient; (vi) $F_{comb}$(sign(a(t))) represents a combined force of rolling friction, road inclination and vehicle braking; (vii) $C_{effi}$ and $F_{comb}$ depend only on a sign of a(t); (viii) $f_{corr}$(v(t), a(t)) represents a minor correction function; (ix) $t_{start}$ represents a current time; (x) $t_{end}$ represents an end time of fine-grain planning; and (xi) D represents a current distance to the end of fine-grain planning.

19. The vehicle of claim 16, wherein the optimization criteria incorporates modelling of rolling friction and aerodynamic drag into fuel consumption of the vehicle with constraint conditions imposed on speed, acceleration, and distance.

20. The vehicle of claim 19, wherein the optimization is represented by the following equation:

$$\min_{v(t)} \int_{t_{start}}^{t_{end}} \left( c_{effi}(\text{sign}(a(t))) * \left( c_1 v^2(t) + Ma(t) + F_{comb}(\text{sign}(a(t))) \right) * v(t) + c_2 + f_{corr}(v(t), a(t)) \right) dt,$$

subject to the following constraints:

$$v_{min} \leq v(t) \leq v_{max}(v_{min} > 0), a_{min} \leq a(t) \leq a_{max}(a_{min} < 0),$$

and $$a(t_0) = \left( \frac{dv(t)}{dt} \right)\bigg|_{t=t_0}, \int_{t_{start}}^{t_{end}} v(t)dt = D,$$

in which: (i) v(t) and a(t) represent the speed and acceleration respectively, both represented in terms of (discretized) functions of time, (ii) M represents a mass of the vehicle; (iii) $c_1$ represents a constant related to aerodynamic drag; (iv) $C_2$ represents a constant related to auxiliary power; (v) $C_{effi}$ (sign(a(t))) represents an efficiency coefficient; (vi) $F_{comb}$(sign(a(t))) represents a combined force of rolling friction, road inclination and vehicle braking; (vii) $C_{effi}$ and $F_{comb}$ depend only on a sign of a(t); (viii) $f_{corr}$(v(t), a(t)) represents a minor correction function; (ix) $t_{start}$ represents a current time; (x) $t_{end}$ represents an end time of fine-grain planning; and (xi) D represents a current distance to the end of fine-grain planning.

* * * * *